United States Patent [19]

Goto et al.

[11] Patent Number: 4,646,184

[45] Date of Patent: Feb. 24, 1987

[54] MAGNETIC HEAD FOR RECORDING AND REPRODUCTION

[75] Inventors: Tadahiko Goto, Kitakyushu; Hideo Abe, Iruma, both of Japan

[73] Assignee: Ye Data Inc., Tokyo, Japan

[21] Appl. No.: 653,094

[22] Filed: Sep. 21, 1984

[30] Foreign Application Priority Data

Sep. 21, 1983 [JP] Japan .............................. 58-173140
Oct. 20, 1983 [JP] Japan .............................. 58-195347

[51] Int. Cl.⁴ .............................................. G11B 5/12
[52] U.S. Cl. .................................... 360/110; 360/120
[58] Field of Search ............ 360/110, 115, 119, 120, 360/122, 125

[56] References Cited

U.S. PATENT DOCUMENTS

| | | | |
|---|---|---|---|
| 3,508,014 | 4/1970 | Mersing | 360/120 |
| 3,686,467 | 8/1972 | Camras | 360/110 |
| 4,048,714 | 9/1977 | Huntt | 360/120 X |
| 4,130,846 | 12/1978 | Best | 360/120 |
| 4,182,643 | 1/1980 | Calderon, Jr. et al. | 360/120 X |
| 4,228,473 | 10/1980 | Himuro et al. | 360/114 |
| 4,398,229 | 8/1983 | McClure | 360/120 X |
| 4,564,877 | 1/1986 | Ezaki et al. | 360/122 X |

Primary Examiner—John H. Wolff
Attorney, Agent, or Firm—Wenderoth, Lind & Ponack

[57] ABSTRACT

There is provided a magnetic head used for both magnetic recording and reproduction thereof, comprising a magnetic head body with a gap portion, wherein a first material having a larger saturated magnetic flux density than that of said body is applied to one or both sides of said gap portion, said gap being internally provided with a second material having a smaller saturated magnetic flux density than said body.

16 Claims, 15 Drawing Figures

RUNNING DIRECTION OF MEDIUM a : FERRITE
b : FERRITE
c : HIGH SATURATED MAGNETIC FLUX DENSITY
d : LOW SATURATED MAGNETIC FLUX DENSITY a : FERRITE
b : FERRITE
c : HIGH SATURATED MAGNETIC FLUX DENSITY
d : LOW SATURATED MAGNETIC FLUX DENSITY

- a FERRITE
- b FERRITE
- c HIGH SATURATED MAGNETIC FLUX DENSITY
- d LOW SATURATED MAGNETIC FLUX DENSITY

- a FERRITE
- b FERRITE
- c HIGH SATURATED MAGNETIC FLUX DENSITY
- d LOW SATURATED MAGNETIC FLUX DENSITY

MAGNETIC HEAD FOR RECORDING AND REPRODUCTION

BACKGROUND OF THE INVENTION

The present invention relates to a magnetic head used for magnetic reading/writing.

At present, the main emphasis in a magnetic head used for a magnetic reading device, particularly, for a flopy disc drive device is a writing and reading magnetic head in which reading and writing are carried out by a single magnetic head, in view of production cost and advantageousness of the device into simplification.

However, the writing and reading magnetic head has a disadvantage that the specific characteristics thereof are inferior to that of an exclusive-use magnetic head for the following reasons.

It is known that in writing, a magnetic field in excess of an antimagnetic force Hc of the medium need be generated in the writing medium. To this end, it is required that the length of head gap be made greater than the sum of a thickness of a writing layer of the medium and a gap between the magnetic head and the medium, that is, a spacing, so as to generate a large magnetic flux in the gap surface.

With regard to a head material, it is important that a saturated magnetic flux density of the material be large.

On the other hand, in reading, it is necessary to introduce a change in magnetization recorded in the medium to a coil portion of the magnetic head with high resolution. Therefore, it is important that the effective length of head gap in reading be narrow and that as for the material's specific characteristics, large initial permeability is needed since a fine magnetic flux being detected. For example, if the length of the head gap is greater than the writing wavelength, the change in magnetization cannot be detected. Generally, the effective length of gap is set at a value less than ½ of the writing wavelength.

It is not important so much that in reading, the magnetic flux density of material is large.

As described above, writing and reading magnetic heads have to be provided with special characteristics different from each other. In case of the writing magnetic head, the the length of the gap is preferably large from the viewpoint of writing efficiency, and in case of the reading magnetic head, the gap is preferably small from the viewpoint of the reading frequency characteristic. However, the length of the gap of a conventional writing and reading magnetic head is set at an approximately middle valve between the length of the gap of the read exclusive magnetic head and the length of the gap of the write exclusive magnetic head, and therefore, involves a disadvantage that the special characteristic thereof is inferior to the case which uses each exclusive-use heads for writing and reading.

On the other hand, ferrite is used as the material for the magnetic head of this kind since ferrite is excellent in accuracy of finishing, frequency characteristic, wear resistance, etc. Recently, the antimagnetic force of the medium has tended to increase due to the requirement of high density of magnetic writing, and it is difficult to provide sufficient magnetization with a saturated magnetic flux density (hereinafter referred to as "Bs") of the ferrite which is the main current of a head material.

Therefore, in a conventional writing and reading magnetic head, in setting the length of the gap, the middle value is employed with respect to the requirement contrary to writing and reading (wide in case of writing, and narrow in case of reading due to the frequency characteristics) as described above. Therefore, it is inferior in read/write characteristics such as output level, frequency characteristic or the like to an exclusive-use magnetic head for writing and reading, respectively.

SUMMARY OF THE INVENTION

As described above, special characteristics, which are different from the cases depending on writing and reading, are required by the magnetic head. The present invention is to provide a magnetic head which positively utilizes a saturated characteristic of a magnetic material to have special characteristics as if a single magnetic head functions as two magnetic heads for writing and for reading.

In the present invention, a writing head is formed of a material having a large saturated magnetic flux density, for example, such as Permalloy (Ni-Fe alloy), Sendust (Fe-Si-Al alloy), ferrite, etc., and a material having a small Bs is applied to a head gap portion to form a reading head gap.

The low Bs layer material applied to form a reading head gap has an adverse effect of apparently reducing a gap magnetic flux when writing through a magnetized portion thereof, and therefore, it is effective to select Bs of the low Bs material to be 30% or so of Bs of a magnetic material constituting a writing head gap in consideration of an allowable range of saturated magnetic flux in case where a normal head material is selected.

Furthermore, in the present invention, a magnetic material having a high Bs is applied to a head gap portion so that in writing, a high magnetic flux may be generated in a gap surface relative to the medium from a conventional writing and reading magnetic head to obtain a high characteristic.

Where the low Bs material and high Bs material are applied to a material forming a magnetic head body in an overlapping fashion, the low Bs material is preferably applied externally. If the low Bs material is applied internally with the high Bs material applied externally, the effect of application of the high Bs material is not sufficiently obtained.

The present invention may obtain better writing and reading characteristics than an arrangement wherein exclusive-use magnetic heads for writing and reading are provided.

This simplifies the magnetic head as compared with a device wherein exclusive-use magnetic heads are respectively used for writing and reading, improves the special characteristics at low cost, and greatly contributes to simplification of the device.

As can be seen from the magnetic flux distribution in writing of each of embodiments shown below, the requirement of the low Bs material layer relative to the initial permeability is gentler than other magnetic material layers since the thickness of the low Bs material, namely, the distance of the magnetic flux passing through the low Bs material is short.

DESCRIPTION OF THE PREFERRED EMBODIMENTS

Embodiment 1

Figure 1:
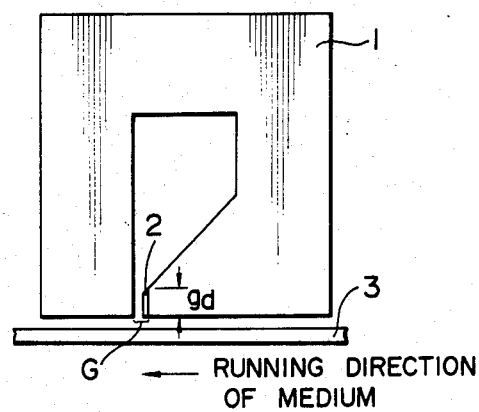
FIG. 1 is a side view of an embodiment in accordance with the present invention.
Figure 2:
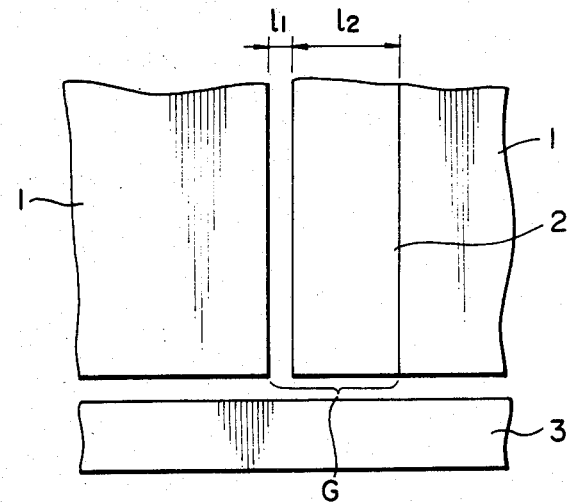
FIG. 2 is an enlarged side view of a portion in the vicinity of a head gap portion of FIG. 1.

FIG. 1 shows the structure of a magnetic head where a vertical anisotropic medium 3 is used, and FIG. 2 shows an enlarged side view of a portion in the vicinity of a head gap portion. Reference numeral 1 designates a body formed of the same material as the conventional material, that is, ferrite, and 2 designates a low Bs layer (garnet is used in the embodiment) provided on one magnetic pole of a head gap portion G. Shapes and various properties of the magnetic head and a medium 3 are as given in Table 1.

TABLE 1

| Magnetic Head | |
|---|---|
| Thickness of non-magnetic layer $l_1$ | 0.4 (μm) |
| Depth of gap gd | 10.0 (μm) |
| Saturated magnetic flux density of ferrite | 5,000 (G) |
| Material of low saturated magnetic flux density | garnet |
| Saturated magnetic flux density of garnet | 1,000 (G) |
| Thickness of garnet material $l_2$ | 1.0 (82 m) |
| Medium | |
| Material (vertical anisotropic material) | Ba-ferrite |
| Saturated magnetic flux density | 1500 (G) |
| Antimagnetic force | 800 (Oe) |
| Spacing | 0.2 (μm) |
| Thickness of a writing layer | 1.0 (μm) |

Figure 3:
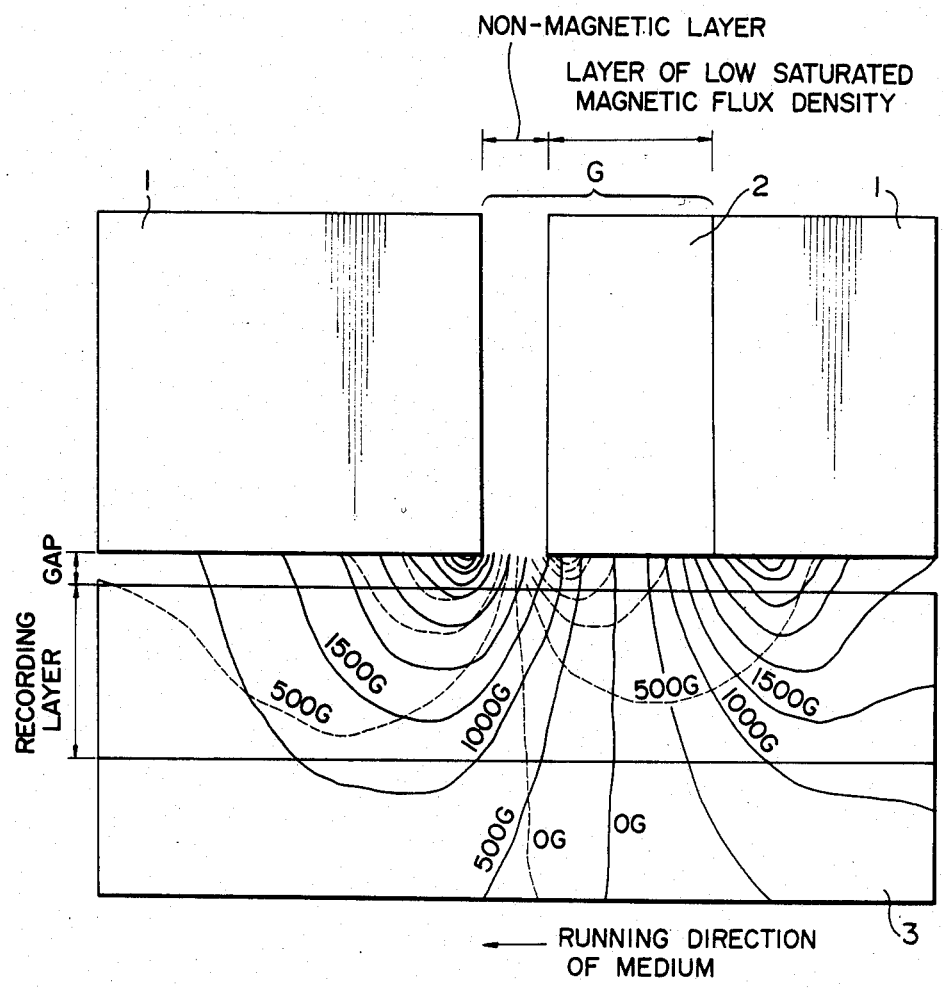
FIG. 3 is a view showing a vertical component of magnetic flux density within the medium in writing with the magnetic head shown in FIG. 1.

The result of simulation analysis of a vertical component of equimagnetic flux density in the vicinity of a head gap where writing is carried out at 600 mAT with various properties is shown in FIG. 3.

In FIG. 3, the solid line shows the properties of the magnetic head in accordance with the present invention, and the dotted line shows the properties of a conventional magnetic head entirety of which is formed of ferrite. As shown, in the magnetic head in accordance with the present invention, the center QG (zero gauss) of distribution is not the center of the head gap portion G but the center of the sum of the low Bs material layer 2 and the length of gap, and in writing, the low Bs material layer can be substantially ignored and has a function of a wide gap. In this case, as can be seen from the writing portion of the distribution of magnetic flux, the distribution is dense, and the value is large and the writing performance is good.

Figure 4:
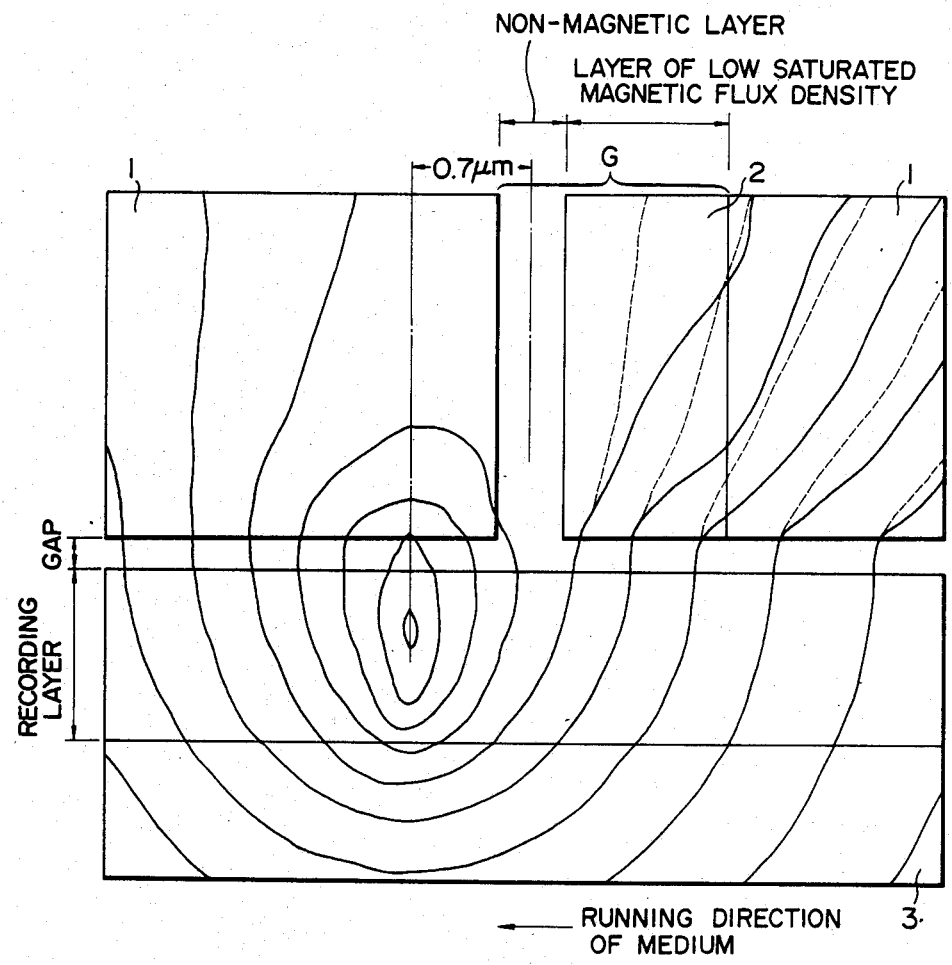
FIG. 4 is a view showing a flow of magnetic flux within the medium in reading with the magnetic head shown in FIG. 1.

FIG. 4 shows the analysis of the flow of magnetic flux in reading. In this case, it is assumed that residual magnetization of the medium is only in the vertical direction, and a boundary of magnetized inversion is 0.7 μm away from the center of a non-magnetic layer.

As a result, it is apparent that also in case of the low Bs material, the magnetic flux flowing into the magnetic head flows in equally to the case (indicated at the dotted line) where a narrow gap is formed of ferrite as in prior art, and has a narrow gap effect in reading and both writing and reading are excellent in properties.

Embodiment 2

This embodiment is concerned with the case where the magnetic head in the previous embodiment in accordance with the present invention is used in the case of carrying out a conventional horizontal writing. For the medium, a horizontal anisotropic material as shown in Table 2 is used.

TABLE 2

| Material (horizontal anisotropic material) | γ-Fe$_2$O$_3$ |
|---|---|
| Saturated magnetic flux density | 1250 (G) |
| Antimagnetic force | 300 (Oe) |
| Thickness of writing layer | 1.0 (μm) |

Figure 5:
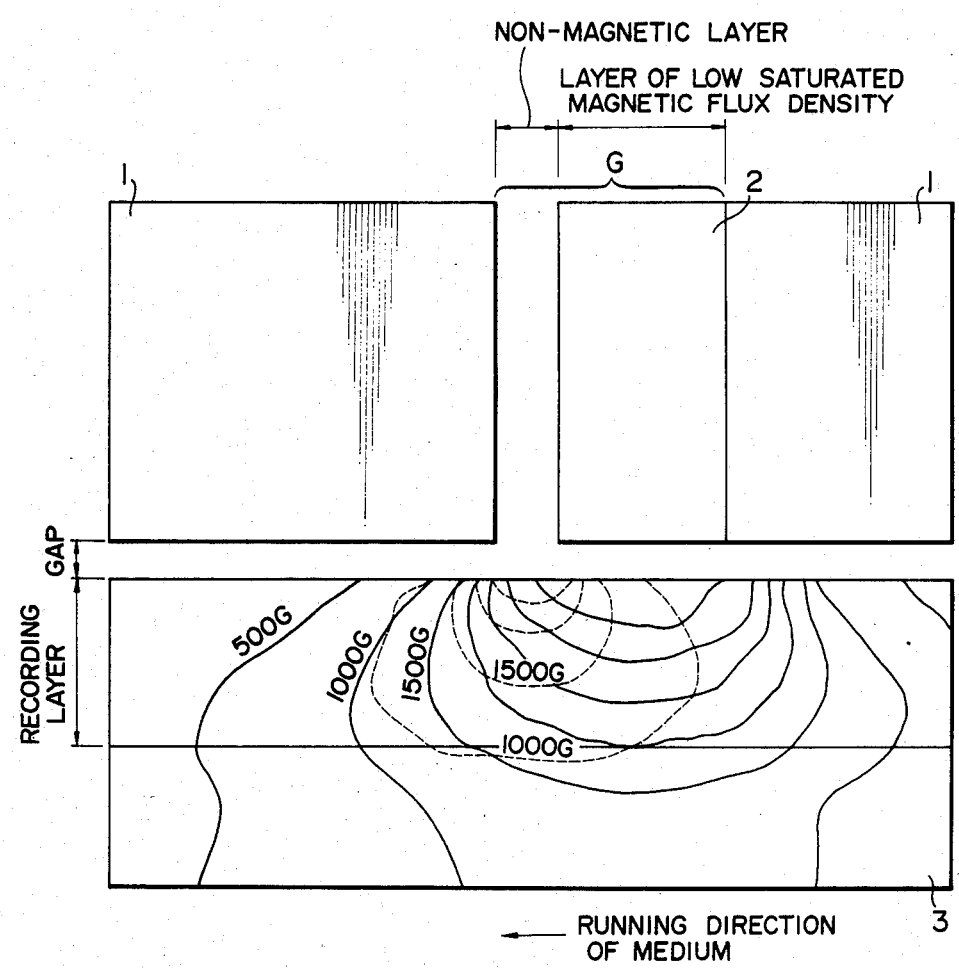
FIG. 5 is a view showing a horizontal component of magnetic flux density within medium in writing in a further embodiment.

The result of simulation analysis, by using a limited element method, of an equimagnetic flux density horizontal component in the vicinity of a head gap where writing is carried out at 600 mAT using a magnetic head and a medium in accordance with the present invention is shown in FIG. 5. In FIG. 5, the solid line designates the case of the magnetic head in accordance with the present invention, and the dotted line designates the case of the magnetic head of ferrite.

Figure 6:
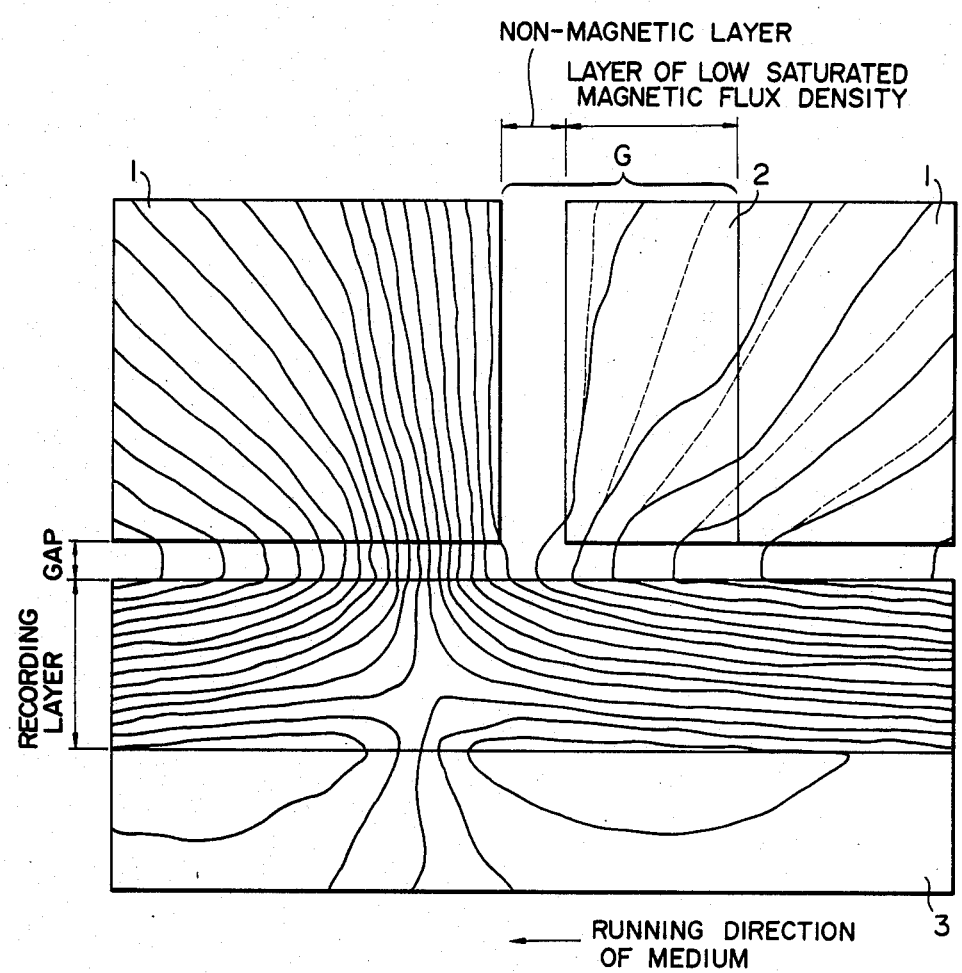
FIG. 6 is a view showing a flow of magnetic flux within the medium likewise in reading.

As will be evident from FIG. 5, it will be understood that in case of writing by the magnetic head in accordance with the present invention, the low Bs layer can be substantially ignored. It can be assured that a wide gap is formed at the time of writing, and it will be therefore understood that it is greatly magnetized in a horizontal direction. The case at the time of reading is shown in FIG. 6. In this case, it is assumed that residual magnetization of the medium merely comprises a horizontal component, and a boundary of magnetized inversion is 0.7 μm away from the center of the head.

As will be apparent from FIG. 6, it is understood that the magnetic flux flowing into the magnetic head in accordance with the present invention flows in equally to a conventional magnetic head which is formed entirely of ferrite. Accordingly, even the case suited for a conventional writing, the magnetic head in accordance with the present invention displays the effects of wide gap writing and narrow gap reading.

Since the state of magnetization read in the medium is determined by a magnetic field as the medium moves away from the gap of the head, it is preferable that the magnetic field of the gap acutely changes in a direction where the medium moves. In FIG. 3, the magnetic flux acutely changes on the side wherein a magnetic layer of the low Bs is not present, and it is therefore preferable that the low Bs material layer 2 be provided on the opposite side in the moving direction of the medium 3, that is, on the opposite side of the writing section.

In view of the high frequency characteristic and wear resisting characteristic of the magnetic head, ferrite is suitable. In this case, it is effective to use, as a low Bs material, a garnet whose Bs is less than 1000 G which is less than ferrite by 30% and whose Curie temperature at which no magnetism is present, is above 150° C.

Alternatively, the body 1 can be formed of an alloy series (including an amorphous magnetic member) of Bs above 10000 G, and the low Bs layer provided in the head gap portion may comprise ferrite or garnet.

Embodiment 3

Figure 7:
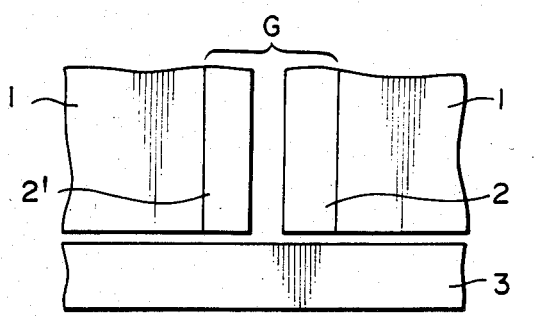
FIG. 7 is an enlarged side view of a modified embodiment.

FIG. 7 shows a further embodiment of the present invention. While in the above-described embodiments 1 and 2, the low Bs layer provided in the head gap portion G is provided on one side alone, it is noted in this embodiment that low Bs material layers 2, 2' are provided on both sides in the head gap portion G.

The special characteristics of writing and reading in this embodiment are different in construction from the Embodiments 1 and 2 but substantially similar characteristics may be obtained.

Accordingly, the magnetic head with the low Bs material layers provided on both sides in the head gap, likewise one with a low Bs material layer provided on one side alone, may obtain excellent writing and reading properties in horizontal writing and vertical writing due to the effects of wide gap at the time of writing and narrow gap at the time of reading.

It is most effective that a thickness of a low Bs material layer be set to $l_2$ assuming that $l_1 + l_2$ is the length of external gap which effectively acts at the time of writing (the length of gap at the time of writing) and $l_1$ is the length of optimum internal gap which effectively acts at the time of reading (the length of gap at the time of reading). The "optimum" herein used means that a writing waveform can be written.

Embodiment 4

Figure 8A:
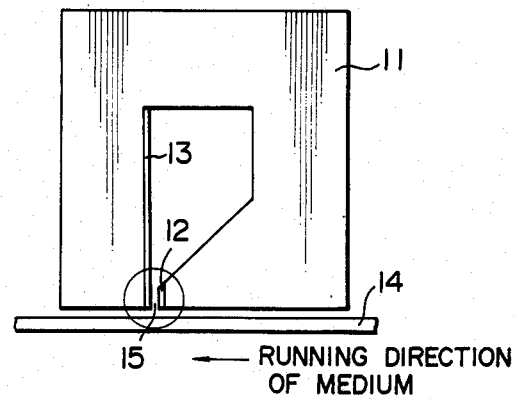
FIG. 8(a) is a side view of another embodiment.
Figure 8B:
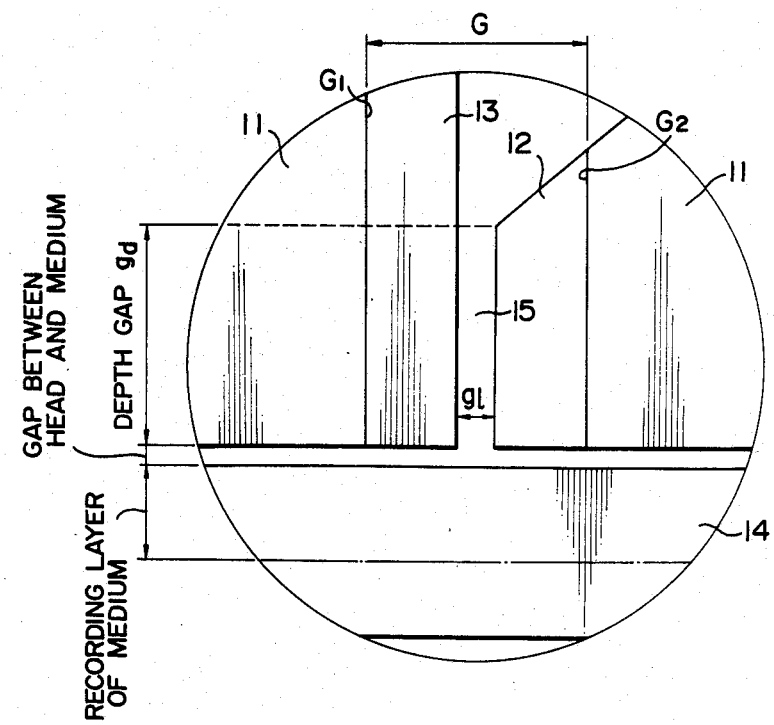
FIG. 8(b) is an enlarge view of a head cap portion of the magnetic head shown in FIG. 8(a).

FIG. 8(a) shows a contour of construction of a different embodiment in accordance with the present invention, and FIG. 8(b) is an enlarged view of a head gap portion of FIG. 8(a). In the figures, reference numeral 11 designates a magnetic head body, 12 a low Bs material layer formed on the side on the right-hand side of a head gap G, 13 a high Bs material layer formed on the side on the left-hand side of the head gap portion G, 14 a meddium, and 15 a non-magnetic layer formed of air, plastic filler, etc.

Hereinafter, the magnetic layer 15 is referred to as an internal gap, and one having a low Bs material layer applied thereto is referred to as an external gap.

Accordingly, the magnetic head shown in FIG. 8(a) and FIG. 8(b) makes the external gap effective at the time writing, accurately generates the writing effective magnetic flux, and makes the internal gap effectively act at the time of reading.

Particulars of this Embodiment are as shown in Table 3.

TABLE 3

| | |
|---|---|
| (1) Body | |
| Thickness of non-magnetic body g | 0.4 ($\mu$m) |
| Depth of gap gd | 10.0 ($\mu$m) |
| Saturated magnetic flux density of body 11 (ferrite) | 5,000 (G) |
| Thickness of high Bs layer 13 (alloy material) | 1.0 ($\mu$m) |
| Saturated magnetic flux density of high Bs layer 13 | 10,000 (G) |
| Thickness of low Bs layer 12 (garnet) | 1.0 ($\mu$m) |
| Saturated magnetic flux density of low Bs layer 12 | 1,000 (G) |
| (2) Medium | |
| Material (Ba ferrite) | vertical anisotropy |
| Saturated magnetic flux density | 1500 (G) |
| Antimagnetic force | 800 (Oe) |
| Spacing between head and medium | 0.2 ($\mu$m) |
| Thickness of writing layer | 1.0 ($\mu$m) |

Figure 9:
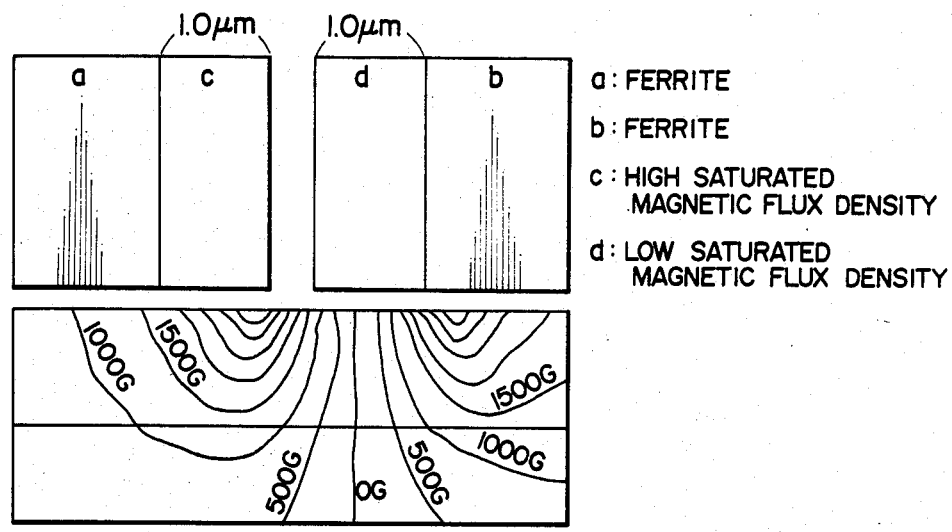
FIG. 9 is an explanatory view showing a distribution of a vertical component of magnetic flux density in writing with the magnetic head shown in FIG. 8 where a vertical anisotropic material is selected as a medium.

The result of analysis, using a limited element method, of a vertical component of magnetic flux when writing is carried out by varying a material in the vicinity of the head cap with a magnetomotive force fixed to 600 mAT is shown in FIG. 9.

In this embodiment, the body comprises an a portion and a b portion formed of ferrite, and a c portion formed of a high Bs layer, and a d portion formed of a low Bs layer, in which case, a trailing edge side is set on the high Bs layer side.

It is understood that the magnetic flux density on the trailing edge side is large as compared with the embodiment of FIG. 3.

This effect results from the high Bs material layer.

It will be understood from the foregoing that with the magnetic head in accordance with the present invention it is possible to obtain high special characteristics in vertical recording by the low Bs layer and high Bs layer.

Figure 10:
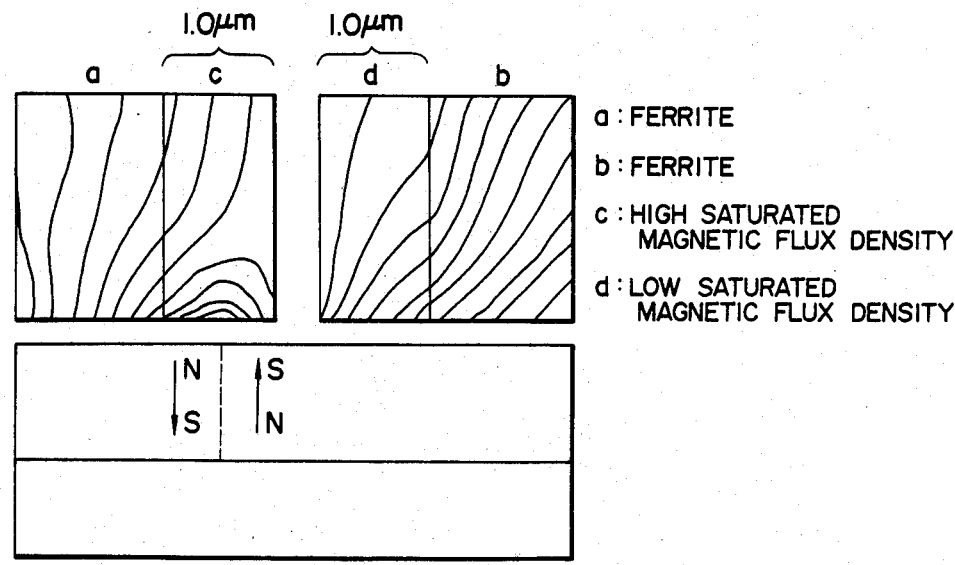
FIG. 10 is an explanatory view showing a distribution of magnetic flux flowing into the head in reading where a vertical anisotropic material is selected as a medium.

FIG. 10 depicts a contour of magnetic flux flowing into the head on the assumption that when the magnetic head of the present invention is used for reading, the medium is completely vertically magnetized. In this case, a boundary of magnetized invasion of the medium is at a position deviated by 0.7 $\mu$m to left from the center of the head non-magnetic layer.

As may be seen from FIG. 10, the narrow gas reading effect may be assured at the time of reading with respect to the wide gap writing effect at the time of writing by the magnetic characteristic of the d portion.

It will be apparent from the embodiments previously described that the magnetic head in accordance with the present invention has a wide gap at the time of writing, has a writing characteristic better than a conventional head having a wide gap, and has the narrow gap effect at the time of reading.

Since the magnetic field effective at the time of writing for the medium is the magnetic field when the gap of the head leaves, it is preferable that the magnetic field of the gap acutely changes on the moving side of the medium. As may be seen from FIG. 9, since the magnetic flux acutely changes on the side of the low Bs where no magnetic layer is present, it is preferable that the low Bs layer be provided on the opposite side of the moving direction of the medium 14, and the high Bs layer is provided in the moving direction.

Embodiment 5

In the following embodiment, the medium 14 is selected by horizontal anisotropy. The properties, shapes and the like of the medium are given in Table 4. The properties and shapes of the head are the same as those given in Table 3.

TABLE 4

| Medium | |
|---|---|
| Material ($\gamma$-$Fe_2O_3$) | Horizontal anisotropy |
| Saturated magnetic flux density | 1200 (G) |
| Antimagnetic force | 300 (Oe) |
| Spacing between head and medium | 0.2 ($\mu$m) |
| Thickness of writing layer | 1.0 ($\mu$m) |

Figure 11:
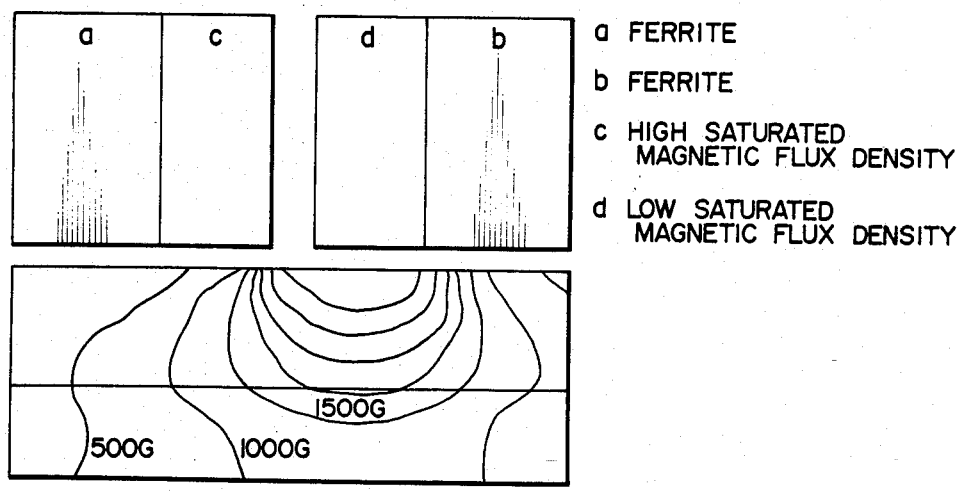
FIG. 11 is an explanatory view showing a distribution of a horizontal component of magnetic flux density in writing with the magnetic head shown in FIG. 8, where a horizontal anisotropic material is selected as a medium.

The result of analysis, using a limited element method, of distribution of horizontal component of magnetic flux density in the vicinity of the head gap when the medium being read at 600 mAT is shown in FIG. 11.

Figure 12:
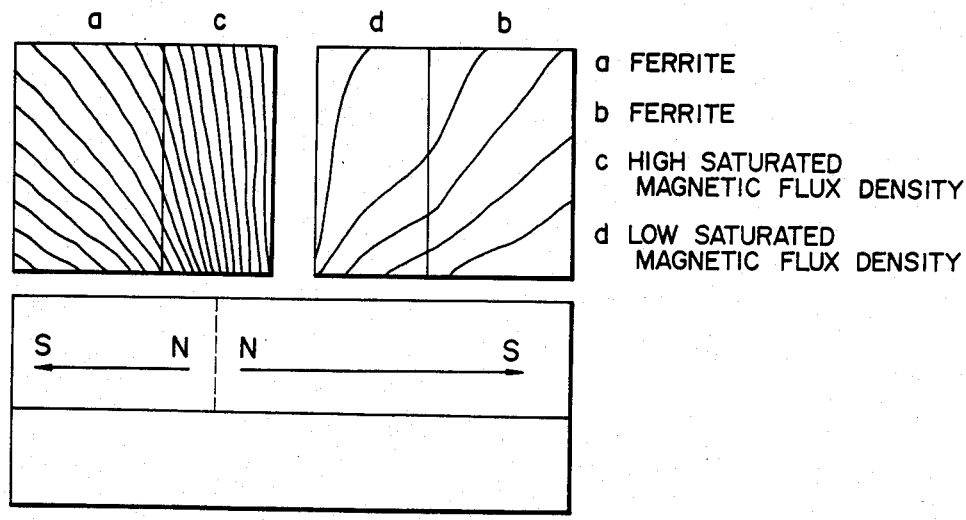
FIG. 12 is an explanatory view showing a distribution with magnetic flux flowing into the head in reading of the embodiment shown in FIG. 8, where a horizontal anisotropic material is selected as a medium.

FIG. 12 depicts the magnetic flux flowing into the head on the assumption that when the magnetic head in the embodiment is used for reading, the medium is completely horizontally magnetized. In this case, a boundary of magnetized invasion of the medium is at a position deviated by 0.7 $\mu$m to left from the center of the head non-magnetic layer.

As can be seen from FIG. 12, the narrow gas reading effect may be assured at the time of reading with respect to the wide gap writing effect at the time of writing by the magnetic characteristic of the d portion.

It will be apparent from the embodiments previously described that the magnetic head in accordance with the present invention has a wide gap at the time of writing even in case of the horizontal writing, has a writing characteristic better than a conventional head having a wide gap, and has the narrow gap effect at the time of reading.

Embodiment 6

Figure 13:
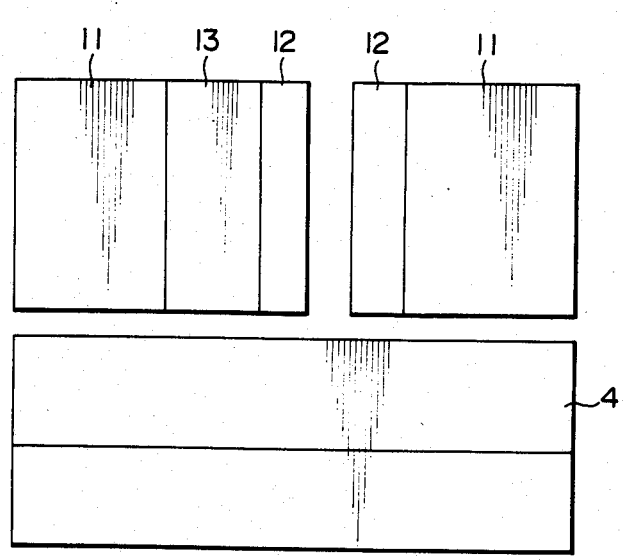
FIGS. 13 and 14 are respectively enlarged side views of another embodiments of the present invention.

FIG. 13 shows a still another embodiment of the present invention.

While in the embodiments shown in FIGS. 4 and 9, the low Bs layer provided in the gap is provided on the side of the gap on the opposite side of the high Bs layer, it will be noted that they can be provided on both sides of the side of the head gap portion.

In this case, the characteristics of writing and reading have multi-layered low Bs layers as compared with the above-described embodiment in terms of construction but substantially similar characteristics may be obtained.

Accordingly, it will be apparent that the magnetic head with the low Bs material layers provided on both sides in the head gap, likewise one with a low Bs material layer provided on one side alone, may obtain excellent writing and reading properties in horizontal writing and vertical writing due to the effects of wide gap at the time of writing and narrow gap at the time of reading.

Embodiment 7

Figure 14:
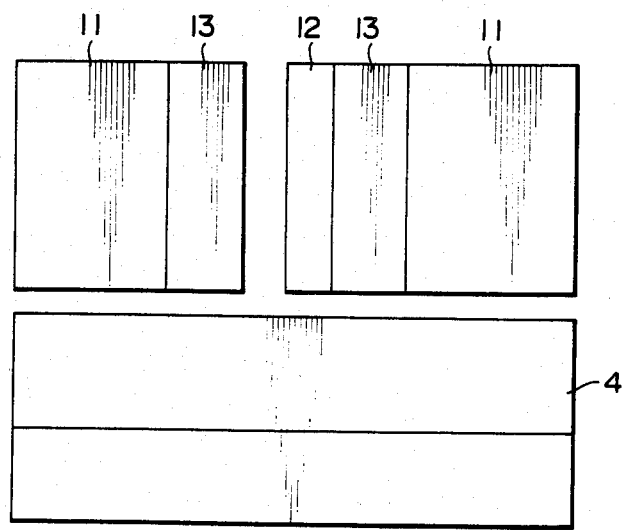

FIG. 14 shows another embodiment of a multilayer type, in which high Bs layers 13, 13 are provided on both sides of the head gap. This embodiment is complicated in construction but properties close to those shown in FIGS. 11 and 12 are obtained.

With respect to the low Bs layer 12, assuming that $l_1$ represents the length of external gap which effectively acts at the time of writing and $l_2$ represents the length of internal gap which effectively acts at the time of reading, the thickness of $l_1-l_2$ corresponds to the thickness of the low Bs layer.

Considering the characteristic of the head material, in view of the high frequency characteristic and wear resisting characteristic of the magnetic head, ferrite is suitable as a material for the body 11, and as a low Bs material, garnet is effectively used whose Bs is 2000 to 400 G and Curie temperature at which no magentic property is present, is above 150° C. As a high Bs material, a material of metal series such as Ni-Fe (Permalloy), Fe-Si-Al (Sendust) Fe, etc. is preferable because Bs is above 7000 G. An amorphous magnetic material is also effective.

It is also desirable that if Fe-Ni series alloy is used as a basic material, the high Bs material comprises Fe, Fe-Al series alloy, Fe-Co series alloy, and the low Bs material comprises ferrite or garnet.

As will be apparent from the above-described explanation, in accordance with the present invention, a single magnetic head has a function equal to the case where a writing exclusive magnetic head and a reading exclusive magnetic head are used, and therefore, it is possible to provide a magnetic head which is easy in handling at a low cost, the industrial value of which is very high.

What is claimed is:

1. A magnetic head used for both magnetic recording and reproduction thereof, comprising a magnetic head body with a gap portion, wherein the portion of said body on one side of said gap is a trailing edge side and the portion of the body on the other side of said gap is a front edge side, both edges being defined with reference to the running direction of a medium in proximity to said head, and wherein said gap has an internal portion with two substantially opposed sides, one internal side being on said trailing edge side and one internal side being on said front edge side, and wherein a first material having a larger saturated magnetic flux density than that of said body is applied to one or both sides of said gap portion, at least one of said sides of said internal portion said gap being provided with a second material having a smaller saturated magnetic flux density than said body.

2. The magnetic head according to claim 1 wherein said first material is applied to the trailing edge internal side, and said second material is applied to the front edge internal side.

3. The magnetic head according to claim 2 wherein said second material has a thickness equal to the difference between the optimum length of gap when used for reproduction and the optimum length of gap when used for recording.

4. The magnetic head according to claim 2 wherein said body is formed of ferrite, said first material is a metal series material, and said second material is garnet.

5. The magnetic head according to claim 2 wherein said body is formed of iron-nickel alloy, said first material is iron, iron-aluminum alloy or iron-cobalt alloy and said second material is ferrite or garnet.

6. The magnetic head according to claim 2 wherein said first material is applied to the trailing edge side and said second material is applied to both sides of said internal portion.

7. The magnetic head according to claim 6 wherein said second material has a thickness equal to the difference between the optimum length of gap when used for reproduction and the optimum length of gap when used for recording.

8. The magnetic head according to claim 6 wherein said body is formed of ferrite, said first material is a metal series material, and said second material is garnet.

9. The magnetic head according to claim 6 wherein said body is formed of iron-nickel alloy, said first material is iron, iron-aluminum alloy or iron-cobalt alloy and said second material is ferrite or garnet.

10. The magnetic head according to claim 2 wherein said first material is applied to both trailing and front edge sides and said second material is applied to the front edge internal side.

11. The magnetic head according to claim 10 wherein said second material has a thickness equal to the difference between the optimum length of gap when used for reproduction and the optimum length of gap when used for recording.

12. The magnetic head according to claim 10 wherein said body is formed of ferrite, said first material is a metal series material, and said second material is garnet.

13. The magnetic head according to claim 10 wherein said body is formed of iron-nickel alloy, said first material is iron, iron-aluminum alloy or iron-cobalt alloy and said second material is ferrite or garnet.

14. The magnetic head according to claim 1 wherein said second material has a thickness equal to the difference between the optimum length of gap when used for reproduction and the optimum length of gap when used for recording.

15. The magnetic head according to claim 1 wherein said body is formed of ferrite, said first material is a metal series material, and said second material is garnet.

16. The magnetic head according to claim 1 wherein said body is formed of iron-nickel alloy, said first material is iron, iron-aluminum alloy or iron-cobalt alloy, and said second material is ferrite or garnet.

* * * * *